United States Patent [19]

Turner

[11] Patent Number: 5,047,948

[45] Date of Patent: Sep. 10, 1991

[54] MEDICATION DISPENSING SYSTEM

[76] Inventor: Joseph D. Turner, 11613 South 101 East Ave., Bixby, Okla. 74008

[21] Appl. No.: 342,753

[22] Filed: Apr. 25, 1989

[51] Int. Cl.[5] .......... G06F 15/42

[52] U.S. Cl. .......... 364/479; 221/2; 221/9; 221/15; 364/413.02

[58] Field of Search .......... 364/479, 413.02; 221/2-8, 9, 12, 15, 154, 191-196, 312 R, 75; 194/349; 206/538, 539, 533, 535, 1.5; 368/10

[56] References Cited

U.S. PATENT DOCUMENTS

| | | | |
|---|---|---|---|
| 3,556,342 | 1/1971 | Guarr | 221/2 |
| 3,998,356 | 8/1976 | Christensen | 221/2 |
| 4,130,881 | 10/1978 | Haessler et al. | 364/900 |
| 4,258,354 | 9/1981 | Carmon et al. | 340/309.4 |
| 4,267,942 | 1/1981 | Wick, Jr. et al. | 221/2 |
| 4,275,384 | 10/1981 | Hicks et al. | 340/309.4 |
| 4,281,330 | 4/1981 | Warrick | 346/20 |
| 4,360,125 | 7/1982 | Martindale et al. | 221/25 |
| 4,473,884 | 9/1984 | Behl | 364/479 |
| 4,616,316 | 11/1986 | Hanpeter et al. | 364/413 |
| 4,626,105 | 6/1986 | Miller | 368/10 |
| 4,630,125 | 10/1986 | Roetling | 358/280 |
| 4,664,289 | 9/1987 | Shimizu et al. | 221/2 |
| 4,674,651 | 6/1987 | Scidmore et al. | 221/15 X |
| 4,686,624 | 9/1987 | Blum et al. | 364/413 |
| 4,695,954 | 6/1987 | Rose et al. | 364/479 X |
| 4,735,344 | 4/1988 | Wuethrich | 221/194 |
| 4,747,514 | 5/1988 | Stone | 221/15 X |
| 4,763,810 | 9/1988 | Christiansen | 221/15 X |
| 4,785,969 | 11/1988 | McLaughlin | 364/479 X |
| 4,847,764 | 7/1989 | Halvorson | 364/479 X |

*Primary Examiner*—Joseph Ruggiero

*Attorney, Agent, or Firm*—Robert E. Massa

[57] ABSTRACT

A medication dispensing system comprises a portable, securable medication cabinet which includes a programmable logic controller to provide for patient medication control. The system includes periperal components such as a transmitter, patient response means, display means, and a clock. The securable medication cabinet permits easy access by the patient to medication which is prescribed and dispensed logically. The securable cabinet restricts access by the patient to unauthorized medication. The securable medication cabinet contains a plurality of medication dispensing components, each comprising dispensing means, such as a coil attached to a motor positioned interiorly of a wall of the cabinet, to hold a medication package and dispense the package upon actuation of the dispensing means, with means for actuating the dispensing means. A receptacle in the bottom of the cabinet receives a medication package as it is dispensed. A door in a side wall of the cabinet permits access by the patient to a medication package in the receptacle, but a stop in the cabinet restricts opening of the door so that the patient may not reach unauthorized medication packages. The programmable logic controller accepts prescription data and accepts and evaluates patient physical data. The controller is interfaced with the medication dispensing components to select a dispensing component in re prescription data and patient physical data; is interfaced with display components to indicate response by patient to a signal entered; and is interfaced with a peripheral system to respond to a reaction of patient.

12 Claims, 5 Drawing Sheets

MEDICATION DISPENSING SYSTEM

FIELD OF THE INVENTION

My invention relates to medication dispensing systems. More particularly, my invention relates to medication dispensing systems which include a logical controlling component for dispensing medication to a patient in response to programmed signals entered within a control device. Still more particularly, my invention relates to medication dispensing systems which are capable of storing and dispensing medication, accepting prescription data, accepting patient physical data, evaluating data, and providing remote communication.

BACKGROUND OF THE INVENTION

The treatment of ailments with medication has always been a duty and obligation of a "medically trained" segment of a society, such as primitive "medicine men". Magic and religion played a large part in this early medical treatment. Eventually, with the development of writing, the knowledge and authority of the medical practitioner in each society became more evident, particularly in the region of Babylon, as expressed in the Code of Hammurabi. The Code included laws relating to medical practice. The duties and responsibilities of the physicians were made explicit, even to the extent of requiring a physician's hand to be cut off if his patient died after certain treatment had been administered by the physician.

In any society, it has always been a matter of great concern among the medically indoctrinated members whether a person receiving a medical treatment will actually carry out a suggested treatment when not in the presence of the medical member. Prescriptions of medicines to be taken later have always been subject to neglect, forgetfulness, or even worse, consumption of multiple dosages through lapse of memory.

The modern custom has been to supply a patient with a medication and rely upon the patient to follow the written instructions placed thereon in taking the medication at the proper times and to be able to open the medication container. Sometimes the patient's own ailments interfere with either remembering the times specified for each dose or with the ability to open a container, especially where the patient lives alone. Added to the seriousness of the need to comply with the schedule prescribed for each medication is the recognition that many medications being prescribed today are extremely powerful for their immediate purpose and for their potential side effects, and, either multiple dosages or omitted dosages can be extremely harmful to the patient.

In recent years, with the sophistication of precision-designed mechanical and electronic apparatus, the problem of efficiently and carefully dispensing medications under better-controlled conditions has received a great deal of attention. The prior art discloses many dispensing systems which have attempted to provide adequate controls for assuring the patient and the physician that the medication is being administered according to the designated schedule.

I have found in the prior art the following United States patents for various form of medication dispensing systems and controls:

| | | |
|---|---|---|
| U.S. 3,998,356 | Christensen | Dec. 21, 1976 |
| U.S. 4,130,881 | Haessler et al | Dec. 19, 1978 |
| U.S. 4,258,354 | Carmon et al | March 24, 1981 |
| U.S. 4,267,942 | Wick, Jr. et al | May 19, 1981 |
| U.S. 4,275,384 | Hicks et al | June 23, 1981 |
| U.S. 4,281,330 | Warrick | July 28, 1981 |
| U.S. 4,360,125 | Martindale et al | Nov. 23, 1982 |
| U.S. 4,616,316 | Hanpeter et al | Oct. 7, 1986 |
| U.S. 4,626,105 | Miller | Dec. 2, 1986 |
| U.S. 4,630,125 | Roetling | Dec. 16, 1986 |
| U.S. 4,664,289 | Shimizu et al | May 12, 1987 |
| U.S. 4,686,624 | Blum et al | Aug. 11, 1987 |
| U.S. 4,695,954 | Rose et al | Sept. 22, 1987 |

U.S. Pat. No. 3,998,356 to Christensen describes a medication dispensing apparatus comprising a plurality of medication magazines which may be electronically programmable for dispensing the medication contents. Each magazine has an opening over which a compartment of the magazine may be rotated to dispense the contents of that compartment.

U.S. Pat. No. 4,130,881 to Haessler et al describes an automated medical history taking system which includes means for presenting by stored program control a plurality of questions and answers has related to prior steps.

U.S. Pat. No. 4,258,354 to Carmon et al describes a portable alarm device including medicine storage housing. The alarm may be programmed to advise the user of particular times for taking prescribed medicines. An opaque film strip is employed for programming the medication schedule.

U.S. Pat. No. 4,267,942 to Wick. Jr. et al describes a restricted pharmaceutical storage and dispensing cabinet including a recording system for automatic accountability of items dispensed as well as the date and time of removal and identification of the recipient.

U.S. Pat. No. 4,275,384 to Hicks et al describes a portable medicine cabinet which may be carried around by the user. The cabinet contains a multiplicity of compartments into each of which the user places the proper vial of medicine. The user then follows the instructions in programming each compartment to open at the prescribed time and activate an alarm.

U.S. Pat. No. 4,281,330 to Warrick describes a device for recording and monitoring medical procedures, particularly as to procedures occurring while the device is peripheral to a medical process instrument.

U.S. Pat. No. 4,360,125 to Martindale et al describes a medication dispenser which comprises a housing containing the medication and a microcomputer and related components. A visual signal is given the patient and the patient is permitted to open a door of the housing to remove medication. Upon opening the door, a record is implanted in the microcomputer of the time of opening.

U.S. Pat. No. 4,616,316 to Hanpeter et al describes a medication dispensing and monitoring system in which medication is contained in a blister pack having each blister connected to a memory circuit. When a blister is ruptured for removal of medication, the electronic connection is also ruptured and the memory circuit stores the time of rupture. The electronic circuit addresses each individual trace periodically to determine if it is still intact.

U.S. Pat. No. 4,626,105 to Miller describes a medication dispenser having a plurality of dispensing compartments with each compartment having a separate control panel. Each control panel includes indicators showing morning start up time and interval between medications. Also included is an alarm to alert patient to take the medication.

U.S. Pat. No. 4,630,125 to Roetling describes a method of reconstructing a continuous tone image of greyscale values that have been converted to a halftone image of black and white spots.

U.S. Pat. No. 4,664,289 to Shimizu et al describes a medication dispensing apparatus which includes a plurality of drug dispensing cartridges, each controllable to dispense a drug dosage to a common collection portion for packaging.

U.S. Pat. No. 4,686,624 to Blum et al describes a portable apparatus for processing information relative to the health of a person. Instructions and data pertaining to certain foods are entered in an ROM. Qualitative and quantitative data relating to a meal are entered in an RAM. A computer compares, evaluates, and displays data in the ROM and RAM on a screen for the user of the apparatus.

U.S. Pat. No. 4,695,954 to Rose et al describes a modular medication dispensing system comprising memory means programmable to receive prescription data and dispenser means for dispensing medications in response to data stored in the memory means. A hospital medication dispenser includes a control module and peripheral equipment. The medication dispenser includes a microprocessor which receives, interfaced with a transducer, data from a prescription card. In a home medication dispenser all the electrical and electro-mechanical systems are contained within one unit, including the microprocessor which receives prescription data and actuates a series of individual compartments in response to prescription data as well as audio and visual alarms.

SUMMARY OF THE INVENTION

The primary object of my invention is to provide a medication dispensing system which conveniently stores and dispenses medication, is efficient, and is simple to operate.

Another object of my invention is to provide a medication dispensing system which effectively monitors the dispensing of medication and safely controls the dispensing of medication.

Still another object of my invention is to provide a medication dispensing system which is programmable with medication prescription data.

Still another object of my invention is to provide a medication dispensing system which will respond to programmed prescription data to permit safe access to prescribed medication.

Still another object of my invention is to provide efficient and safe access to prescribed medication.

Still another object of my invention is to provide a medication system which accepts physical test data for comparison with previously programmed data and is capable of alerting monitoring and alarm responses.

Still another object of my invention is to provide a medication dispensing system which will limit programmed access to authorized medication.

I have developed a medication dispensing system which is programmable to dispense medication safely and controllably to a patient and which is capable of remotely monitoring a patient. I have designed my medication dispensing system to be able to dispense medication in accordance with a physician's prescription for a patient, and furthermore, to control a patient's accessibility to his prescribed medication only as he authorized. Most simply stated, my system is programmable to notify a patient that it is time for the patient to take a prescribed medication, is programmable to dispense the prescribed medication, and is programmable to actuate an alert signal should the patient fail to respond properly.

I have also provided for an alert signal to be actuable by the patient, or, as programmable, to be actuable upon a response failure by the patient, at a remote component attachable to the medication dispensing system.

I have noticed that several important factors should be considered in the treatment of and dispensation of medicine to a patient being treated in a hospital or nursing home, particularly an elderly patient, or even a patient who is being treated at home. These factors are: proper observation of a patient, suitable monitoring of the conditions of a patient, efficient dispensing of medication to a patient, and the provision of adequate alarms, as may be generated by changes in the condition of a patient.

Many patients require monitoring of their health status and frequent medication. However, for different reasons, a certain percentage of these patients prefer to live by themselves before moving to a health care facility.

A common habit of some of these people is that they forget to take medication at the prescribed times, or forget whether they have taken their medication, consequently taking too little or too much medication. In addition, some patients frequently have medication prescribed on an "as required" basis, and quite often fail to follow the prescribed dosages.

Consequently, I have built my medication dispensing system basically around a conventional programmable logic controller, which is programmable to accept prescription data, accept and evaluate patient physical data, interfaceable with medication dispensing components to select a dispensing component in response to patient prescription data and patient physical data, interfaceable with display components to indicate a response by a patient to a signal entered, and interfaceable with a peripheral system to respond to a condition of the patient.

An example of a programmable logic controller which may be used is an IDEC programmable controller. Another example of such a component is a personal computer, as an IBM, APPLE, DEC, or the like, which may be programmable to control the medication dispensing system I am describing. Where necessary, my control component may include suitable analog to digital converters for certain input and output signals.

I have designed my medication dispensing system to comprise a securable medication dispensing cabinet which will permit access therein only to qualified personnel, as, for instance, a doctor, a nurse, or a pharmacist, for storing the patient's authorized medication in a particular manner by which authorized dosages may be controllably dispensed by programming of the controller.

Most importantly, my medication dispensing cabinet prevents access by a patient to more than the medication dosage which is immediately authorized by his prescription and made accessible to him by the programmable controller. An authorized person loads the medication into the dispensing portion of the securable cabinet, and in accordance with the prescription data entered into the programmable controller, the controller activates a dispensing means in the cabinet to cause an authorized dosage to be dispensed into a receptacle in the cabinet. A door in a wall of the cabinet permits access by the patient to the authorized dosage, but a stop member within the cabinet restricts the movement of the door so that the patient may not gain access to additional dosages which are currently unauthorized.

I have designed my securable cabinet to contain most of the operable components of my medication system, such as the programmable logic controller, medication dispensing components, clock, telecommunication components, switches, lights, signals, and displays.

With my medication dispensing system, I provide signal means and display components, and means for interfacing with other peripheral systems, both to indicate whether a patient has responded properly to an authorization to take the prescribed medication, or whether the patient has failed to accept a dosage when authorized. Also, my system permits a patient to request suitable other medication, which, if authorized, may be readily dispensed by the activation of the proper dispensing components by the logical controller. Further, my system provides a means for gathering data about the patient's physical condition, such as blood pressure, temperature, pulse, or other features, which the patient is able to provide in accordance with his physician's instructions; then, if such data is not within acceptable limits, or if the patient fails to respond, the controller will activate the communication portion of the system to inform the medical personnel of the incongruity.

The above objects and advantages of my invention will become apparent from my description of the following preferred embodiments of my invention.

FIGS. *7a-7d* are flow charts of related programs concerned with requests for aid instituted by a patient.

DESCRIPTION OF THE PREFERRED EMBODIMENTS

Figure 1:
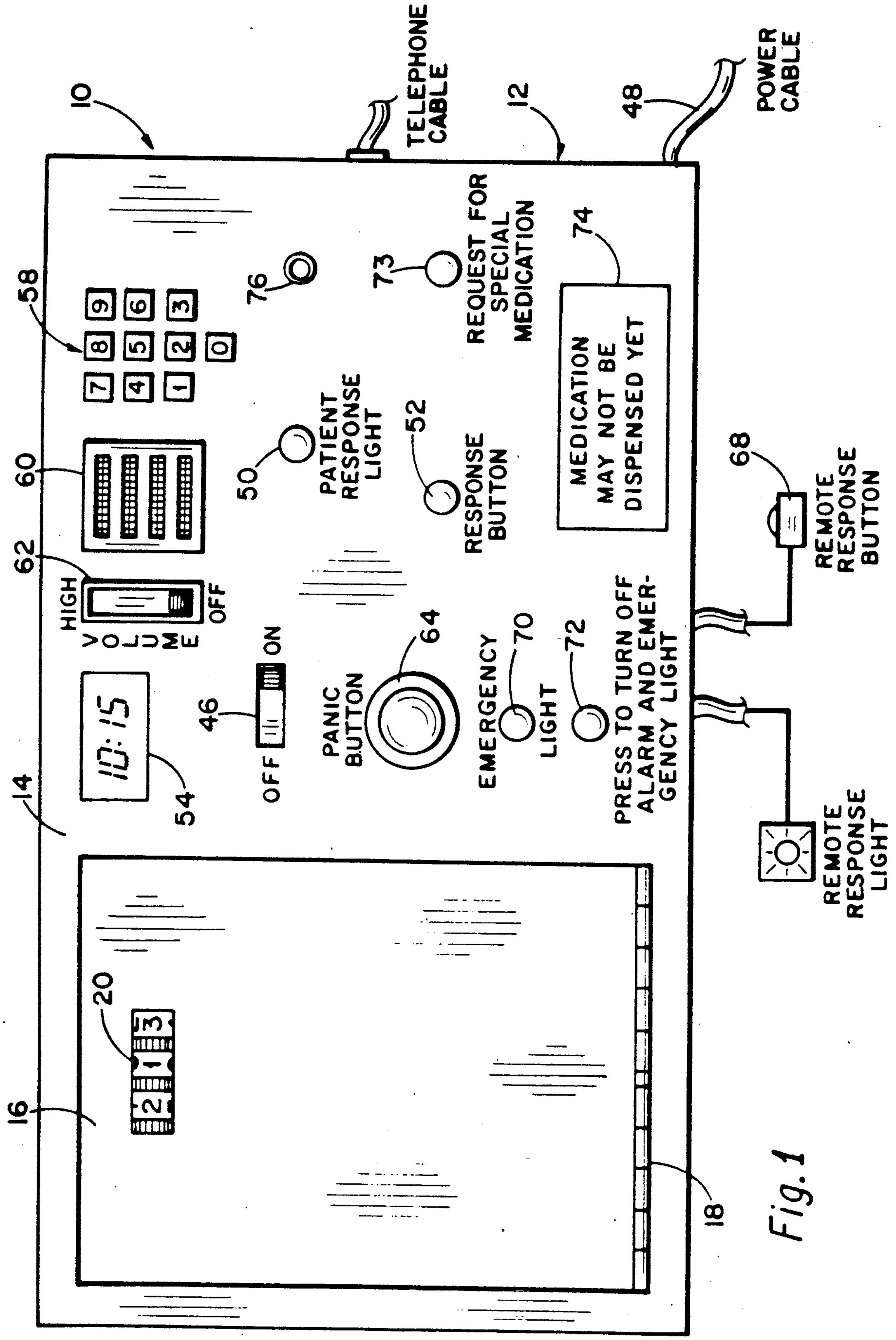
FIG. 1 is a front elevational view of a medication dispensing system according to my invention.

FIG. 1 is a front elevational view of a medication dispensing system 10, generally, comprising a securable medication dispensing cabinet 12, generally, which is designed to include most of the operating components. The medication dispensing cabinet 12 includes a front panel 14 which is secured to the medication cabinet 12 by conventional means (not shown) but which may be loosened by qualified personnel when necessary to adjust, repair, or insert any of the operating components of the system contained therein. Front panel 14 includes a securable door 16 which, in one version, as I show in FIG. 1, is attached to the front panel 14 by means of a piano hinge 18 and includes a combination lock 21. Thus, I am limiting access to the operating components and medication supplies contained therein to authorized personnel only. A patient is permitted access to interior of the medication dispensing cabinet 12 through a door 21 in side panel 22 only sufficiently to reach authorized medication dispensed because a stop 24 secured to the interior of the cabinet 12 limits the opening of the door 21 so that the patient may not reach farther into the cabinet to obtain unauthorized medication. Medication as authorized by patient's prescription which is programmed into a logic controller is dispensed into a receptacle 26 formed in the bottom of the cabinet 12 by structure of bottom wall 28, side panel 22, sloping panel 30 attached to interior panel 32, and lower panel 34, all as shown in FIGS. 2, 3, and 4.

In FIGS. 2, 3, 4, and 5, I am describing a preferred means for controlling dispensation of medication.

Figure 3:
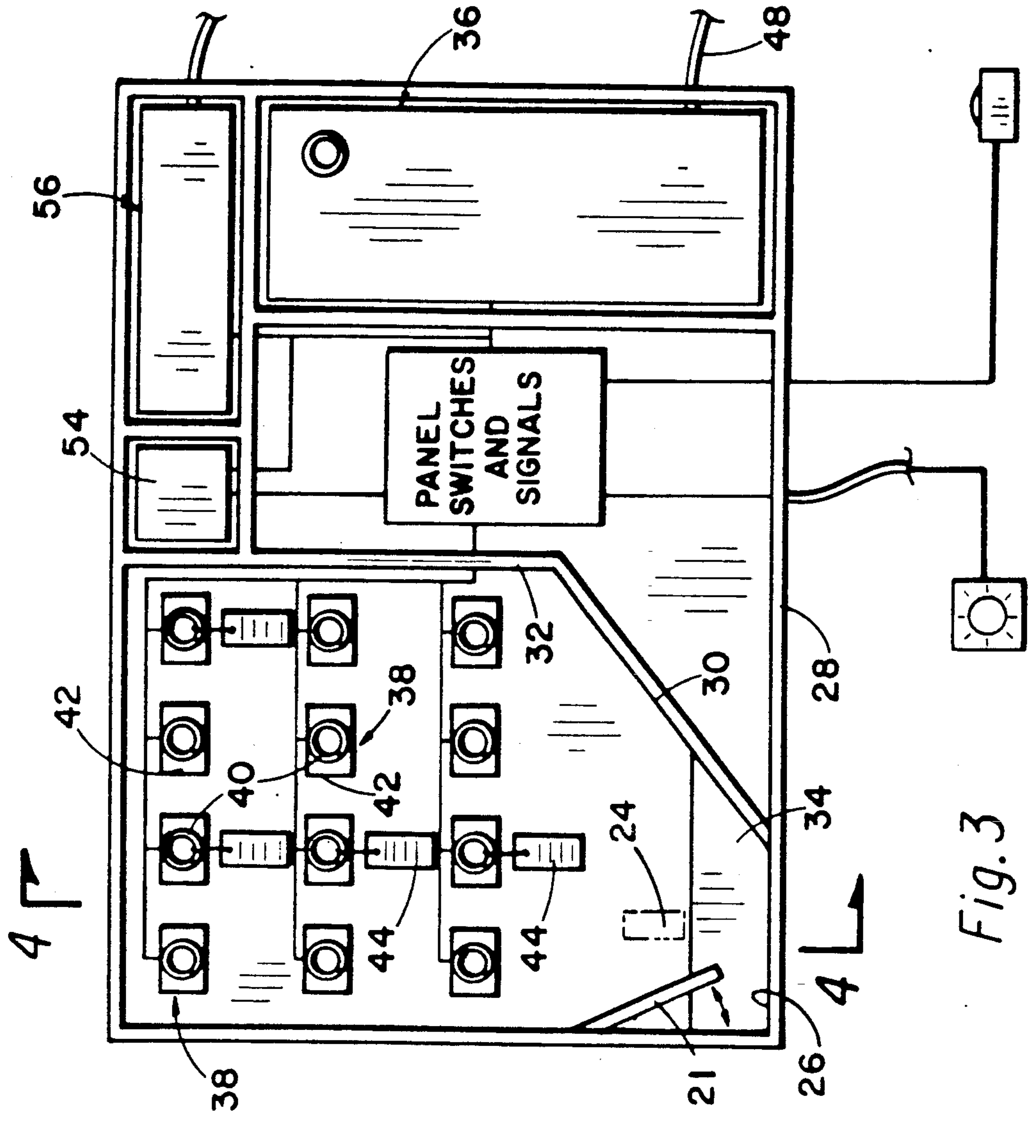
FIG. 3 is a front elevational view of a medication dispensing system according to my invention but with the front panel removed in order to show the positioning of activating components.

FIG. 3 shows a programmable logic controller 36, generally, which, as I described above, provides for the basic programmable control of my medication dispensing system 10. FIG. 3 shows essentially a manner in which operable components of the system are connected.

Figure 2:
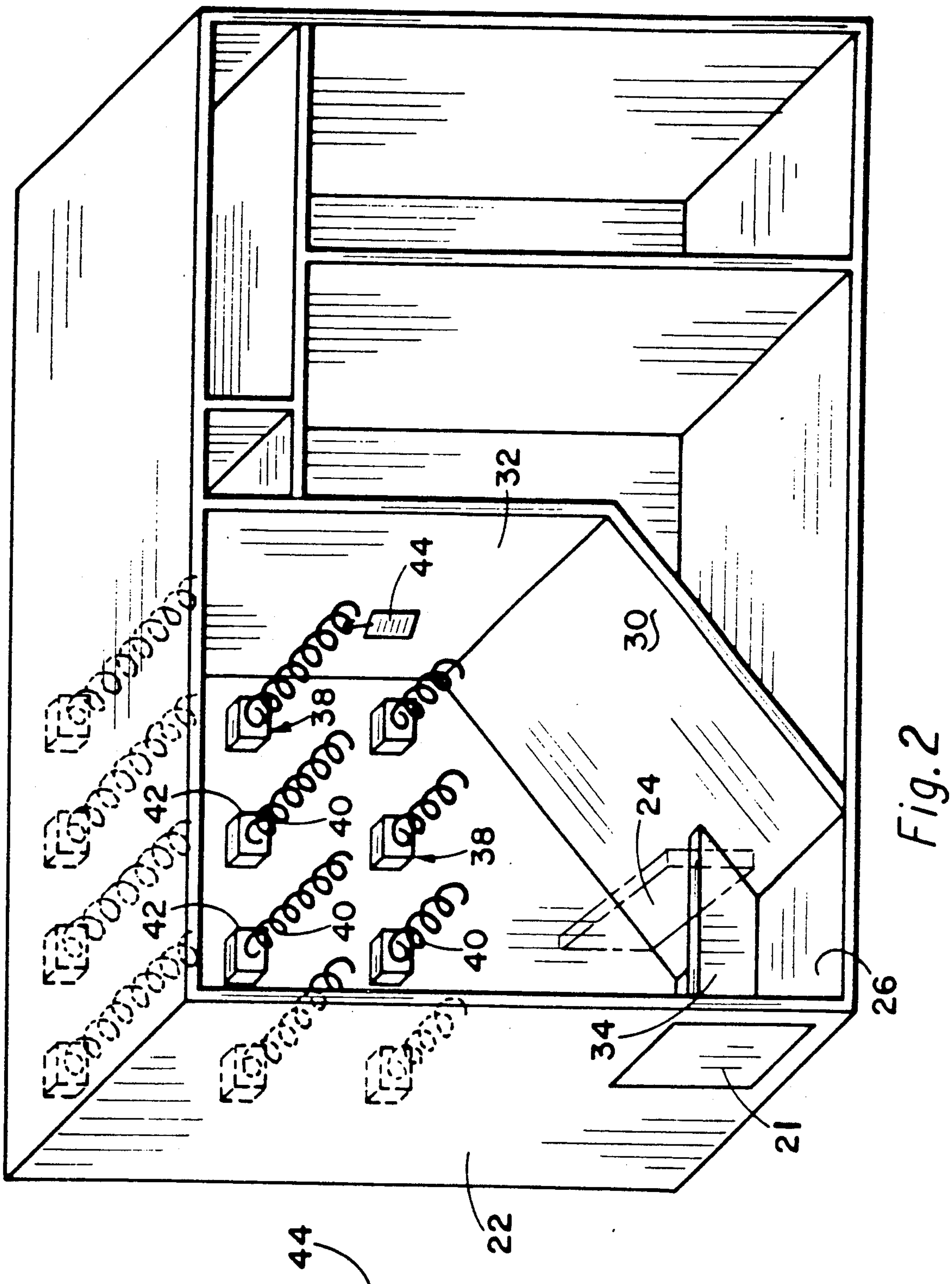
FIG. 2 is a perspective view of a medication dispensing cabinet according to my invention but with the front panel removed in order to show the arrangement of medication dispensing components; but also with electronic control and signalling components removed.
Figure 5:
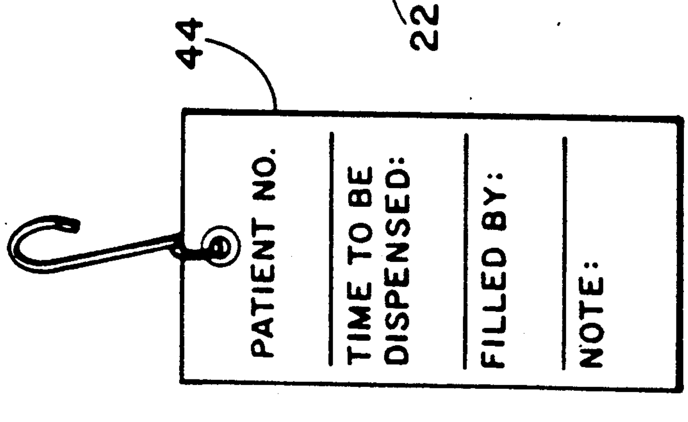
FIG. 5 is a front elevational view of a medication package according to my invention.
Figure 4:
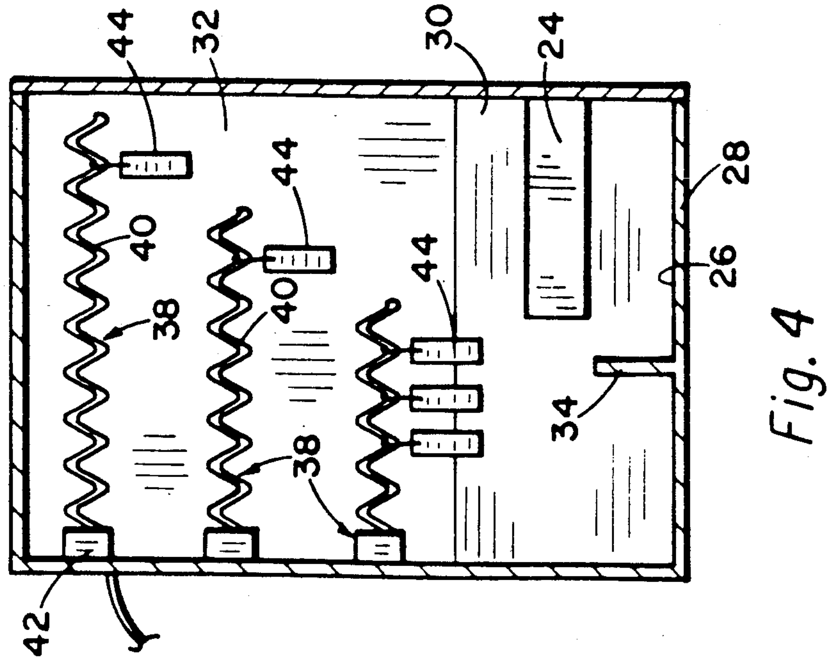
FIG. 4 is a sectional view of the medication dispensing system shown in FIG. 3 along the lines 4—4 of FIG. 3.

In reaction to a medication dispensation program entered into logic controller 36, controller 36 actuates a proper medication dispensing component 38, generally, as shown in plurality in FIGS. 2, 3, and 4, which include a dispensing means 40, shown in this embodiment in the manner of a coil component, and means for actuating the dispensing means 42, shown in this embodiment as an electro mechanical actuator, or in the form of a motor. A proper medication package 44, as described in FIG. 5, is properly filled by the medical personnel and placed upon the dispensing means 40. Thus, upon actuation of an electro-mechanical actuator 42, the attached coil component 40 rotates and the medication package at the end of the coil 40 falls into the receptacle 26. Again, as I mentioned, the patient is able to reach inside the medication cabinet through door 21 and retrieve the medication package from receptacle 26, but the patient is not able to reach farther into the medication cabinet, and cannot reach any other medication package 44 still remaining upon any of the dispensing components 38.

Referring back to FIG. 1, and as further shown in FIG. 3, I have designed my medication dispensing system to provide a number of beneficial services, those most beneficial to the patient, his physician, and attending medical personnel.

I show in FIG. 1 various controls, switches, signals, and displays for my system, and show diagrammatically in FIG. 3 an arrangement of the various operable devices.

For example, in FIG. 1, a switch 46 actuates the system through means of power supplied through cable 48, with, of course, reserve power supplied as customarily by batteries (not shown) within the unit.

As I mentioned above, the logic controller or computer 36 is capably programmed to provide a variety of services and signals. First of all, the controller 36 may dictate the dispensing of medication in accordance with prescription and physical data entered upon it. The controller may notify the patient that a dosage should then be taken, and may request an acknowledging response from the patient through illumination of patient response light 50, and patient should respond by pressing response button 52 and acceptance of the medication from receptacle 26. I show a clock 54 interfaced with controller 36 for conventional timing of medication dosages. I have also included and interfaced a telecommunication system 56, generally, as shown diagrammatically in FIG. 3, including pushbutton component 58, generally, as shown in FIG. 1, a speaker member 60, and volume control 62.

Should the patient desire emergency medical assistance, he simply presses a panic button 64 or a remote panic button 68, which causes the telecommunications equipment 56 to alert medical personnel at a remote station from which the medical personnel may respond. At the same time that the telecommunications equipment is activated, an emergency light 70 starts flashing, and after medical personnel appear, they can turn off the emergency signals by pressing button 72.

By pressing request button 73, patient may activate controller 36 to dispense special medication. Controller 36 will acknowledge patient's request if physician has entered proper authority for such medication into the controller. Should such medication not be authorized, a request denial will appear upon a display screen 74.

I have also provided my medication dispensing system with an input/output port 76 to enable the logic controller to be interfaced with various peripheral apparatus, such as blood pressure components, temperature devices, pulse measuring components, or other similar devices, so that numerous physical conditions of the patient may be easily programmed into the controller 36.

Figure 6:
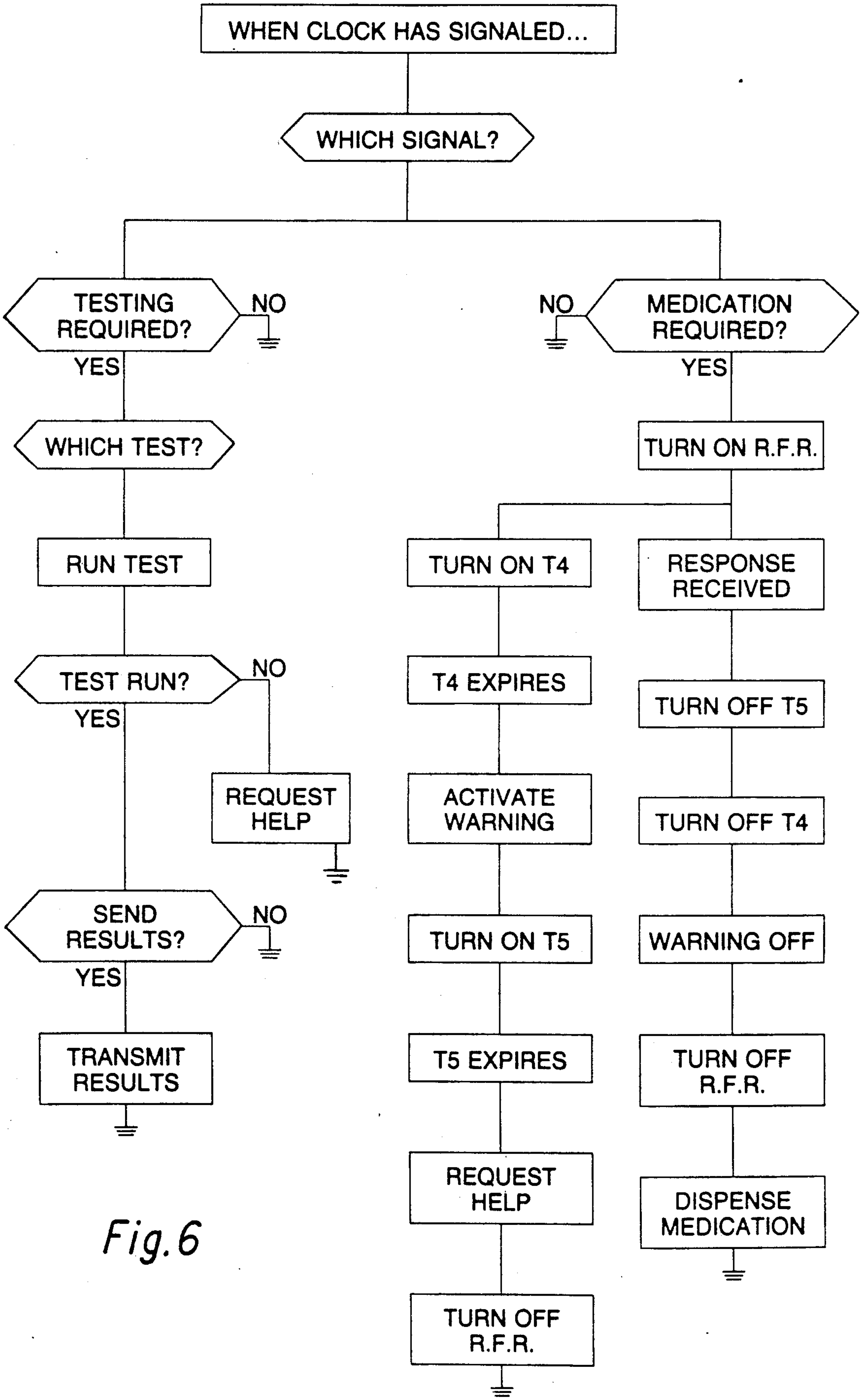
FIG. 6 is a flow chart of a particular program according to my invention.
Figures 7A, 7B, 7C, 7D:
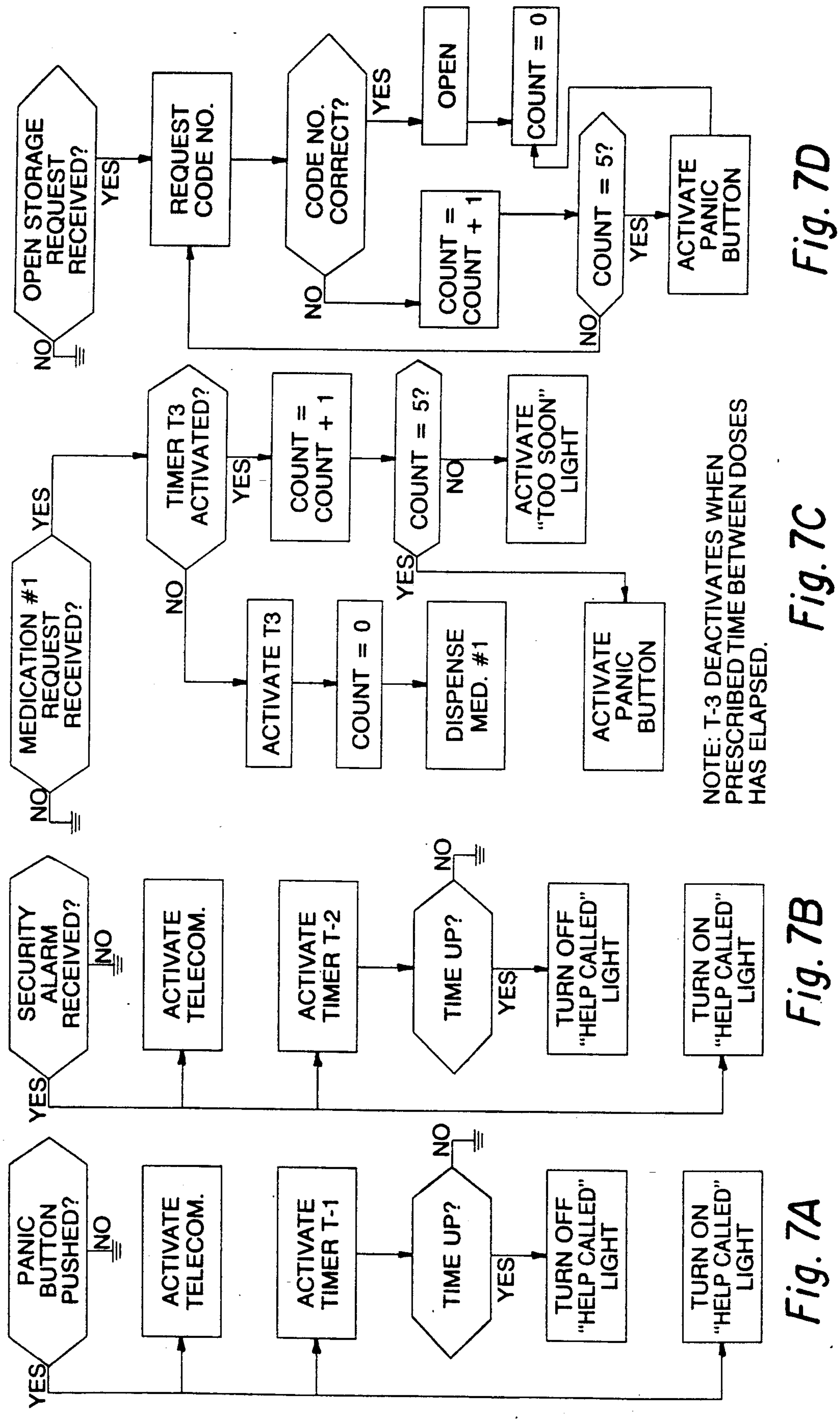

FIGS. 6, and *7a* through *7d* are flow charts outlining and showing the relationship of the procedures and operations I have described above. These flow charts illustrate pictorially various directions to the patient, responses by the patient, and requests by the patient for specific medication, or alerting medical personnel to emergency situations. In these, I have shown various timer controls of the logic controller, timers 1 through 5 simply as T-1 through T-5. Also, "R.F.R." refers to a signal "Request for Response", shown as patient response light 50 on FIG. 1.

Since many different embodiments of my invention may be made without departing from the spirit and scope thereof, it is to be understood that the specific embodiments described in detail herein are not to be taken in a limiting sense, since the scope of the invention is best defined by the appended claims.

I claim:

1. A medication dispensing system, comprising:
a securable medication cabinet containing:
a plurality of medication dispensing components wherein each dispensing component comprises:
dispensing means for holding a medication package and dispensing the package upon actuation comprises a rotatable coil member interiorly of the cabinet upon which a medication package is placed,
a receptacle in the bottom of the cabinet to receive a medication package as it is dispensed,
a door in a side wall to permit access by a patient to a medication package in the receptacle, and
a stop secured to the interior of the cabinet to limit the opening of the door so that the patient may not reach farther into the cabinet to obtain unauthorized medication, and
programmable logic controller means for:
accepting prescription data,
accepting and evaluating patient physical data,
interfacing with medication dispensing components to select a dispensing component in response to patient prescription data and patient physical data,
interfacing with display components to indicate visually a response by patient to a signal entered, and
interfacing with a peripheral system adaptable to respond to a reaction of the patient.

2. A medication dispensing system as described in claim 1, wherein:
the dispensing means for holding a medication package and dispensing the package upon actuation comprises the coil member attached to a motor positioned interiorly on a wall of the cabinet.

3. A medication dispensing system as described in claim 2, wherein:
the peripheral system includes an audio component.

4. A medication dispensing system as described in claim 3, wherein:
the peripheral system includes a transmitter component actuable by the patient.

5. A medication dispensing system as described in claim 4, wherein:
the peripheral system includes remote signalling means.

6. A medication dispensing system as described in claim 5, wherein:
the peripheral system includes a clock.

7. The mediation dispensing system as described in claim 1, wherein:
the programmable logic controller means is •positioned within the cabinet.

8. A medication dispensing system as described in claim 7, wherein:
the dispensing means for holding a medication package and dispensing the package upon actuation comprises the coil member attached to a motor positioned interiorly on a wall of the cabinet.

9. A medication dispensing system as described in claim 8, wherein:
the peripheral system includes an audio component.

10. A medication dispensing system as described in claim 9, wherein;
the peripheral system includes a transmitter component actuable by the patient.

11. A medication dispensing system as described in claim 10, wherein:
the peripheral system includes remote signalling means.

12. A medication dispensing system as described in claim 11, wherein:
the peripheral system includes a clock.

* * * * *